F. A. McNALLY & H. M. & H. H. GARDNER.
STALK CUTTER.
APPLICATION FILED APR. 22, 1915.
1,248,517.
Patented Dec. 4, 1917.
3 SHEETS—SHEET 1.
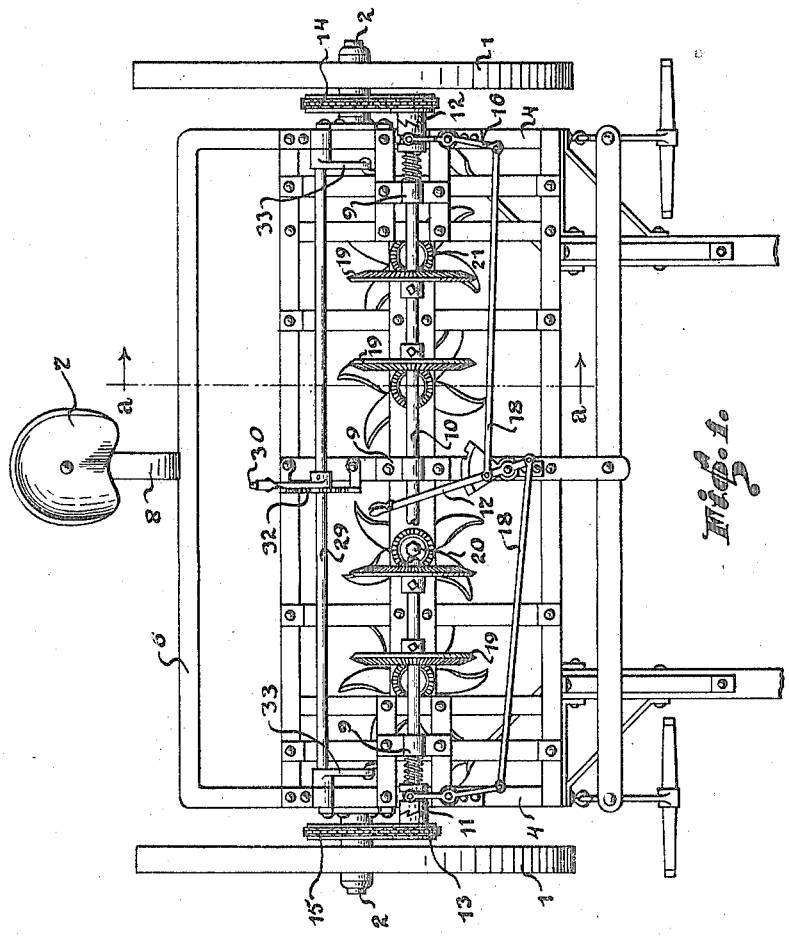
WITNESS:
C. A. Ellis
INVENTOR
F. A. McNally
H. M. Gardner
H. H. Gardner
BY
John M. Spellman
ATTORNEY F. A. McNALLY & H. M. & H. H. GARDNER.
STALK CUTTER.
APPLICATION FILED APR. 22, 1915.
1,248,517.
Patented Dec. 4, 1917.
3 SHEETS—SHEET 2.
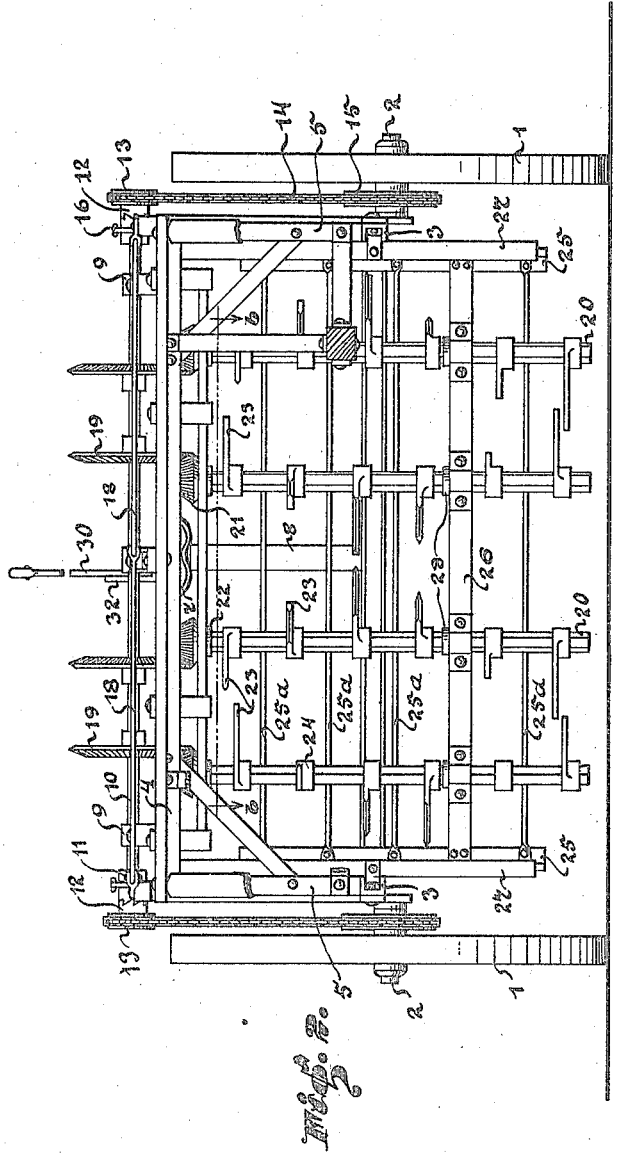
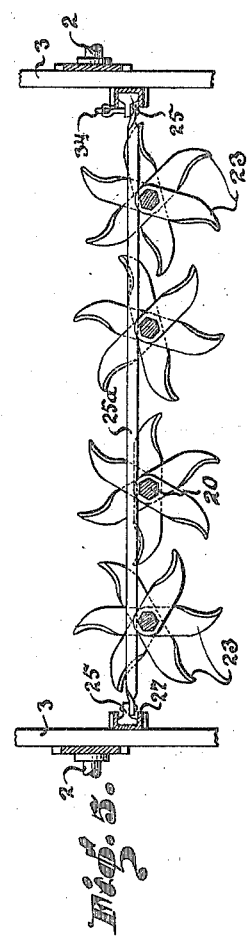
WITNESS:
INVENTOR
F. A. McNally
H. M. Gardner
H. H. Gardner
BY
ATTORNEY

UNITED STATES PATENT OFFICE.

FRANK A. McNALLY, HENRY M. GARDNER, AND HUGH H. GARDNER, OF DALLAS, TEXAS, ASSIGNORS TO THE IMPROVED FARM IMPLEMENT CO., OF DALLAS, TEXAS, A CORPORATION OF TEXAS.

STALK-CUTTER.

1,248,517.  Specification of Letters Patent.  Patented Dec. 4, 1917.

Application filed April 22, 1915. Serial No. 23,003.

*To all whom it may concern:*

Be it known that we, FRANK A. McNALLY, HENRY M. GARDNER, and HUGH H. GARDNER, citizens of the United States, residing at Dallas, in the county of Dallas and State of Texas, have invented certain new and useful Improvements in Stalk-Cutters, of which the following is a specification.

Our invention has relation to that class or type of cutting machines known as stalk cutters in which a series of depending shafts carrying cutting blades are driven by the traction wheels of the machine when the machine is drawn through the field and in such connection it relates more particularly to an improvement upon the machine described and claimed in an application for patent filed by Frank A. McNally, our co-inventor, under date of January 5th, 1915, and Serial No. 563.

In said former application for patent there was described a stalk cutting machine provided with a series of depending cutter shafts operated by the wheels of the vehicle, each of said shafts carrying a plurality of cutter blades, arranged and turning in a plurality of substantially horizontal planes to cut the stalk into a plurality of pieces, the knives of successive planes projecting from the shaft at varying angles with respect to each other.

In our present invention there is provided a similar arrangement of cutting knives but in the present case these knives coöperate with a barred frame in the cutting of the stalk. Besides this improvement or addition to the former machine, there is provided in the present machine a means for raising and lowering the cutter shafts and coöperating frame together with details of construction and arrangement of the blades and the shafts as will be more particularly hereinafter set forth.

The principal objects of our present invention are—

First, to provide in conjunction with one or more depending cutter shafts and blades projecting therefrom in a plurality of planes and at varying angles, of a barred frame coacting with each blade of each shaft in the cutting of a stalk;

Second, to provide means whereby the frame and the cutter shafts may be elevated or depressed to cut the stalks at varying heights from the ground, and Third, to provide a construction of knife blade and of shaft whereby the blade may be readily secured to or removed from the shaft and may be adjusted readily on the shaft to project therefrom at a required angle or face of the shaft.

The nature and scope of our invention will be more fully understood from the following description taken in connection with the accompanying drawings, forming part hereof, in which,—

Figure 1, is a top or plan view of a stalk cutting machine, embodying main features of our invention.

Fig. 2, is a front end elevational view of the same, partly sectioned and partly broken away to more clearly illustrate the construction and arrangement of certain of the parts.

Fig. 5, is a longitudinal sectional view taken on the line $b$, $b$ of Fig. 2.

Figure 3:
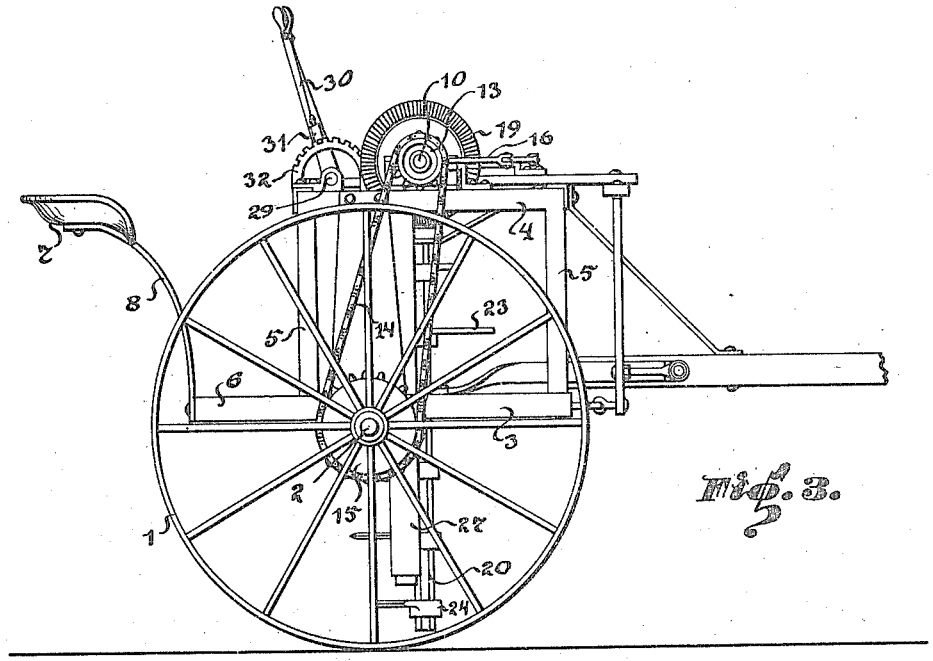
Fig. 3, is a side elevational view of the machine.

Referring to the drawings 1, 1 represent the traction wheels of the machine and 2, 2 the stub axles upon which the wheels 1, 1, turn. The axles 2 project from the sides of a horizontally disposed open frame work 3 and this frame-work 3 is connected with an upper parallel frame 4 by means of the end uprights 5. There is thus constructed a box-like frame having all sides open and the base 3 of this box has its sides and rear 6 projected backward to form a support for the seat 7 of the vehicle, said seat 7 being connected with the rear 6 of frame 3, by a curved spring or springs 8 as clearly shown in Figs. 1, 2 and 3.

The upper frame 4 supports the bearings 9, 9 for the longitudinally arranged shaft 10. Each end of shaft 10 carries a spring controlled clutch collar 11 having a ratchet face normally engaging a similar collar 12 normally turning loosely on shaft 10 and carried by a sprocket wheel 13. A chain 14 connects sprocket 13 with a sprocket 15 carried by the hub of a wheel 1. A clutch arm 16 pivotally supported on the top frame 4 is arranged to control the movement of a clutch collar 11, and the two arms 16 are controlled by hand lever 17 and links 18 in the usual way.

Figure 4:
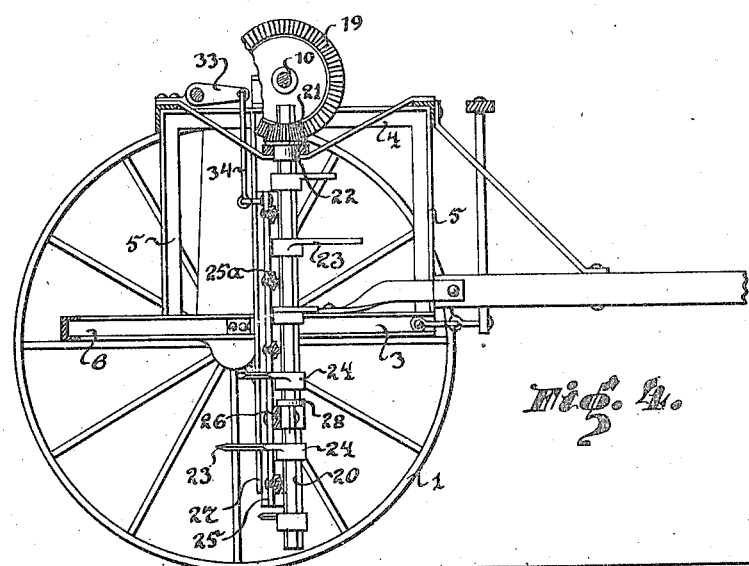
Fig. 4, is a cross-sectional view taken on line $a$, $a$, of Fig. 1.

The shaft 10 carries a series of miter gears 19, one for each vetrically depending cutter shaft 20. In the machine illustrated there are four of these shafts 20 coöperating to cut two rows of cotton or similar stalks. Each cutter shaft 20 is preferably polygonal in cross section and each shaft 20 is arranged to slide up and down in a miter gear 21 meshing in one of the miter gears 19 of shaft 10. As clearly illustrated in Fig. 4, each gear 21 slips on the polygonal end of a shaft 20 and drives the same, the gear 21 having a collar 22 turning in a bearing on frame 4.

Each shaft 20 carries a series of knives 23 arranged in different horizontal planes and corresponding in number to the number of sides to the shaft. In the drawings, there is shown a hexagonal shaft and the knives 23 are six in number. Each knife 23 projects radially from a collar 24 the interior of which is hexagonal to slide upon the hexagonal shaft 20 and to be firmly fixed thereon by pins or wedges not shown. Each knife 23 is turned to project from an angle of the shaft at an angle differing from the angle at which the next knife above or below projects from a next succeeding or preceding angle of said shaft.

Thus on the first shaft at the left hand end of the machine, as illustrated in Figs. 2 and 5, the top knife projects at an angle from the shaft which is 60 degrees in advance of the angle at which the next lower knife projects and this relationship extends all around the shaft as the succeeding knives in lower and lower planes are considered, that is to say, the second blade in descending series is 60 degrees in advance of the third blade and so on.

The shafts 20 are arranged in pairs, each pair to operate upon the stalks of a row. Thus the first and second shafts operate upon one row and the third and fourth shafts operate upon the second row. And it is a feature of our present invention that the knives on one shaft in a pair corresponding to the knives on the other shaft of said pair are arranged to project from the angles of their shaft at angles varying from the angles at which the knives of the other shaft project. To secure this variance, the first shaft at the left travels with its faces directly opposite the angles of the second shaft, and the third shaft travels with its angles approximately 15 degrees behind the angles of the second shaft and 30 degrees on advance of the angles of the fourth shaft. Taking the first or topmost knife of each shaft as an example, it will be seen that this knife on the first shaft is 30 degrees ahead of the first knife of the second shaft in its action upon the stalk and the first knife of the third shaft is 15 degrees behind the first knife of the second shaft and 30 degrees ahead of the first knife of the fourth shaft. It is of course to be understood that the first and third shafts in series turn in the same direction and that the second and fourth shafts turn in an opposite direction the cutting edges of the knives on the second shaft and on the fourth shaft being reversely arranged with respect to the knives of the coöperating first and third shafts.

By reason of this peculiar arrangement of blades on a shaft and the peculiar position of the shafts with relation to each other the cutting operations are not periodic but continuous without jar or interruption, the cutting being evenly distributed from side to side of the machine and without periodic cessation. In other words the cutting is continuous and progressive.

To coöperate with the revoluble knives of the shafts in the proper cutting or slicing of the stalks, there is provided a barred frame 25, the lower portion of which is provided with a cross bar 26 forming the lower bearings or supports for the shafts 20. The sides of this frame 25 slide up and down in channeled supports 27 carried by the sides of the main frame. A collar 28 turning with each shaft serves to support a shaft upon the cross bar 26. The barred frame 25 carries a series of cross rods 25ᵃ which coöperate in holding or bracing the stalks during the cutting operation.

The barred frame 25 may be raised or lowered in the channeled supports carrying with it the shafts 20. A preferred means of securing this vertical adjustment of frame 25 and shafts 20 is illustrated in the drawings and consists essentially of a rock shaft 29 operated by lever 30 having a locking pawl 31 sliding over a notched segment 32. The rock shaft 29 has its bearings in the rear of upper frame 4, and is provided at either end with a crank arm 33 connected by link 34 with the top of barred frame 25. A movement of hand lever 30 after its pawl 31 is released from segment 32 serves to raise or lower the crank arms 33 and hence serves to raise or lower the barred frame 25 and consequently the shafts 20.

Having thus described the nature and objects of our invention what we claim as new and desire to secure by Letters Patent, is,—

1. In a machine of the character described, a series of depending cutter shafts arranged to coöperate in pairs, each cutter shaft being provided with a series of single cutter blades, means for securing each blade to the shaft at a point above or below the succeeding or preceding blade in series, said means being adjustable on the shaft to permit the blade to project at varying angles from the shaft, combined with a barred frame supported by the machine adjacent to and coöperating with the knives of the cutter shafts.

2. In a machine of the character described, a pair of depending cutting shafts of polygonal cross-section and means for rotating the same, a series of cutter knives each projecting from an angle of each shaft and arranged in varying planes, the angles of one of said shafts being so arranged with relation to the angles of the other shaft, that the cutter knives of one shaft travel in advance of the coöperating knives of the other shaft.

3. In a machine of the character described a series of depending cutter shafts of polygonal cross-section, and means for rotating the same, a series of cutter knives each projecting from varying angles of each shaft and in varying horizontal planes, the angles of each of the shafts in series being turned with respect to the angles of the other shafts in series whereby each knife on each shaft performs its cutting operation separately from the other knives on the same shaft and in advance of a knife carried in a corresponding plane by any of the succeeding shafts in series.

In testimony whereof we have signed our names to this specification.

FRANK A. McNALLY.
HENRY M. GARDNER.
HUGH H. GARDNER.

Copies of this patent may be obtained for five cents each, by addressing the "Commissioner of Patents, Washington, D. C."